United States Patent [19]

Miki

[11] Patent Number: 4,776,240
[45] Date of Patent: Oct. 11, 1988

[54] AUTOMATIC TRANSMISSION

[75] Inventor: Nobuaki Miki, Aichi, Japan

[73] Assignee: Aisin Warner Kabushiki Kaisha, Aichi, Japan

[21] Appl. No.: 345,950

[22] Filed: Feb. 4, 1982

[51] Int. Cl.⁴ .............................................. B60K 41/10
[52] U.S. Cl. ....................................... 74/869; 74/867; 74/866
[58] Field of Search .............. 74/867, 868, 869, 752 A, 74/DIG. 1

[56] References Cited

U.S. PATENT DOCUMENTS

| | | | |
|---|---|---|---|
| 3,703,110 | 11/1972 | Uozumi et al. | 74/868 |
| 3,709,064 | 1/1973 | Schaefer et al. | 74/869 X |
| 4,068,543 | 1/1978 | Sakai et al. | 74/866 |
| 4,106,368 | 8/1978 | Ivey | 74/866 |
| 4,188,839 | 2/1980 | Kubo et al. | 74/869 |
| 4,226,142 | 10/1980 | Rembold et al. | 74/867 |
| 4,252,148 | 2/1981 | Fochtman et al. | 74/869 X |
| 4,298,105 | 11/1981 | Duhaime | 74/868 X |
| 4,308,764 | 1/1982 | Kawamoto et al. | 74/869 X |
| 4,338,832 | 7/1982 | Pelligrino | 74/867 X |

*Primary Examiner*—Dirk Wright
*Attorney, Agent, or Firm*—Blum Kaplan

[57] ABSTRACT

An automatic transmission comprising a fluid torque converter; a transmission gear comprising a first gear unit having three forward-speed gears and one reverse gear and a second gear unit having a high-speed gear and a low-speed gear; and a hydraulic control system comprising first and second shift valves for controlling the shifting between the speed gears of the first gear unit, a third shift valve for controlling the shifting between the high-speed gear and the low-speed gear of the second gear unit, a manual selector valve having five shift positions, i.e. D, I. L, R and P-position, and first, second and third solenoid valves related with the first, second and third shift valves respectively.

The automatic transmission is capable of providing six forward-speed automatic transmission when the manual selector valve is shifted to the D-position, three forward-speed automatic transmission including the first, third and fifth speeds when the manual selector valve is shifted to the I-position, three forward-speed automatic transmission including the first, third and fifth speeds and allowing effective engine braking when the manual selector valve is shifted to the L-position, and two-speed reverse automatic transmission when the manual selector valve is shifted to the R-position.

6 Claims, 2 Drawing Sheets

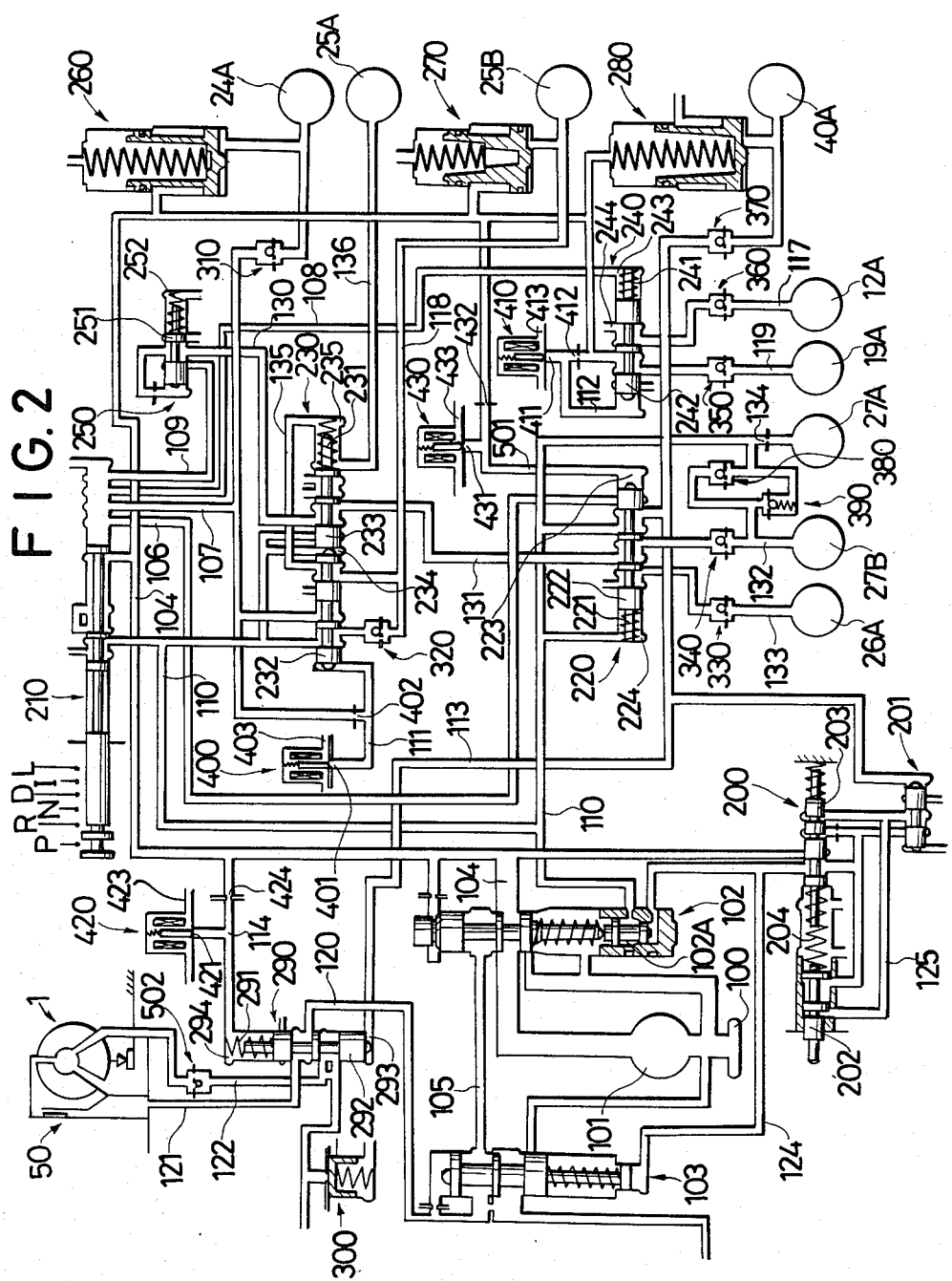

AUTOMATIC TRANSMISSION

BACKGROUND OF THE INVENTION

The present invention relates to an automatic transmission and more particularly to a hydraulic control system for an automatic transmission capable of selecting six forward speed range automatic transmission and three forward speed range automatic transmission through the operation of a manual selector valve.

Generally, an automatic transmission for a motor vehicle comprises a fluid torque converter and a transmission gear having three forward range gearings and a single reverse gearing. In order to comply with the increasing demand for the economical running of motor vehicles, an automatic transmission capable of four forward speed range automatic transmission has been developed, in which an additional gear unit comprising an over-drive gearing of a high speed range and a low speed range gearing is provided for the conventional transmission gear as described hereinbefore.

The number of forward speed ranges of a transmission will be required to be increased still further in order to attain economical running of motor vehicles corresponding to versatile running conditions.

What is needed to comply with such a requirement is a compact and highly reliable hydraulic control system for a vehicle automatic transmission having multiple forward speed range gearings.

SUMMARY OF THE INVENTION

Generally speaking, in accordance with the present invention, an automatic transmission especially suitable of a compact design and capable of economical operation is provided. The automatic transmission comprises a fluid torque converter, a first gear unit having three forward range gearings and a second gear unit having a low and a high speed range gearing and a hydraulic control system. The hydraulic control system includes a source of pressurized fluid, a first and a second shift valve for controlling the change-over between the forward ranges of the first gear unit, a third shift valve for controlling the change-over between the ranges of the second gear unit and a manual selector valve for selectively distributing the pressurized fluid to those shift valves. The hydraulic control system includes also first, second and third solenoid valves corresponding to those first, second and third shift valves respectively for controlling the respective operations of those shift valves and means to fixedly positioning the spool of the third shift valve at one end position when the manual shift valve is placed at a specific shift position.

Accordingly, it is an object of the present invention to provide an automatic transmission equipped with a transmission gear having a first gear unit comprising three forward gearings and a second gear unit comprising two forward speed gearings, i.e. a high forward speed and a low forward speed, and capable of selectively employing the automatic transmission of six forward speeds and the automatic transmission of three forward speeds.

The present invention accordingly comprises features of construction, combinations of elements and arrangement of parts which will be exemplified in the constructions hereinafter set forth, and the scope of the invention will be indicated in the appended claims.

BRIEF DESCRIPTION OF THE DRAWINGS

For a fuller understanding of the invention, reference is had to the following description, taken in connection with the accompanying drawings, in which:

FIG. 2 is a circuit diagram of one embodiment of a hydraulic control system for an automatic transmission in accordance with the present invention.

DESCRIPTION OF THE PREFERRED EMBODIMENTS

Figure 1:
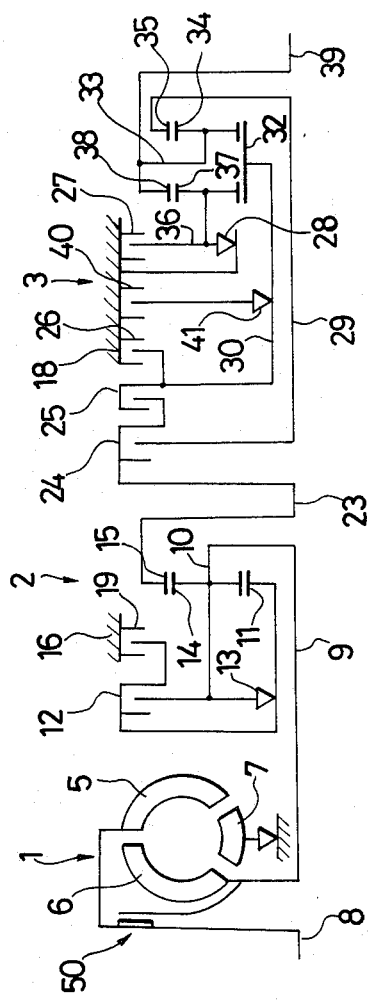
FIG. 1 is a diagrammatic illustration of a power transmitting mechanism of an automatic transmission suitable for incorporating a hydraulic control system in accordance with the present invention.

Referring to FIGS. 1 and 2, an exemplary six-forward-speed automatic transmission equipped with the hydraulic control system in accordance with the present invention will be described hereinafter.

This automatic transmission comprises a fluid torque converter 1, an overdrive mechanism 2 and a change gear system 3 having three forward speed gearings and one reverse gearing. The fluid torque converter 1 is of a known type comprising a pump 5, a turbine 6 and a stator 7. The pump 5 and the turbine 6 are connected to the crank shaft 8 of the engine and a turbine shaft 9 respectively. The turbine shaft 9 functions as the output shaft of the fluid torque converter 1 as well as the input shaft of the overdrive mechanism 2. A carrier 10 of a planetary gear of the overdrive mechanism 2 is connected to the turbine shaft 9. A direct-coupling clutch 50 is interposed between the crank shaft 8 of the engine and the turbine shaft 9 to mechanically connect the crank shaft 8 of the engine and the turbine shaft 9 when the direct-coupling clutch is engaged. A planetary pinion 14 rotatably supported on the carrier 10 is engaged with a sun gear 11 and the ring gear 15 of the planetary gear. A multiple-disk clutch 12 and a one-way clutch 13 are provided between the sun gear 11 and the carrier 10, while a multiple-disk brake 19 is provided between the sun gear 11 and a housing 16 of the overdrive mechanism 2. The ring gear 15 of the planetary gear of the overdrive mechanism 2 is connected to an input shaft 23 of the change gear system 3. A multiple-disk clutch 24 is interposed between the input shaft 23 and an intermediate shaft 29, while a multiple-disk clutch 25 is interposed between the input shaft 23 and a sun gear shaft 30. A multiple-disk brake 26 is interposed between the sun gear shaft 30 and a transmission case 18, while a multiple-disk brake 40 is interposed between the sun gear shaft 30 and the transmission case 18 through a one-way clutch 41. A sun gear 32 functions as a common sun gear for two sets of planetary gear comprising a carrier 33, a planetary pinion 34 carried on the carrier 33, a ring gear 35 engaged with the planetary pinion 34, another carrier 36, a planetary pinion 37 carried on the carrier 36 and a ring gear 8 engaged with the planetary pinion 37. The ring gear 35 of one of the planetary gears is connected to the intermediate shaft 29. The carrier 33 of the planetary gear is connected to the ring gear 38 of the other set of the planetary gears and also to an output shaft 39. A multiple-disk brake 27 and a one-way clutch 28 are interposed between the carrier 36 and the transmission case 18.

The hydraulic control system, which will be detailed hereunder, is adapted to control the hydraulic automatic transmission equipped with an overdrive (O/D) mechanism as described hereinbefore through the engagement or disengagement of the respective clutches or the brakes corresponding to the engine output power and the vehicle speed causing speed change operations between the six forward ranges including the O/D range and also through the manual shifting between the two reverse ranges.

Table 1 shows the operating condition of the clutches and the brakes relative to the position of the change gear. In Table 1, symbol O designates that the clutches or the brakes are in an engaged state, and X indicates that the clutches or the brakes are in a released state. CL indicates clutch; BR indicates brake; OC indicates one-way clutch. LK indicates that the one-way clutches are in a locked state, and OR indicates that the one-way clutches are in an overrunning state.

TABLE 1

| Shift position | | | CL 12 | CL 24 | CL 25 | BR 19 | BR 26 | BR 27 | BR 40 | OC 13 | OC 28 | OC 41 |
|---|---|---|---|---|---|---|---|---|---|---|---|---|
| Parking | | | X | X | X | O | X | X | X | | | |
| Reverse | | Low | O | X | O | X | X | O | X | LK | OR | OR |
| | | High | X | X | O | O | X | X | O | OR | OR | OR |
| Neutral | | | X | X | X | O | X | X | O | | | |
| Forward | D-Range | 1st | O | O | X | X | X | X | X | LK | OR | LK |
| | | 2nd | X | O | X | O | X | X | X | OR | OR | OR |
| | | 3rd | O | O | X | X | X | X | O | LK | LK | OR |
| | | 4th | X | O | X | O | X | X | O | OR | OR | OR |
| | | 5th | O | O | O | X | X | X | O | LK | OR | OR |
| | | 6th | X | O | O | O | X | X | O | OR | OR | OR |
| | I-Range | 1st | O | O | X | X | X | X | X | LK | OR | LK |
| | | 3rd | O | O | X | X | X | X | O | LK | LK | OR |
| | | 5th | O | O | O | X | X | X | O | LK | OR | OR |
| | L-Range | 1st | O | O | X | X | X | O | X | LK | OR | LK |
| | | 3rd | O | O | X | X | O | X | O | LK | LK | OR |
| | | 5th | O | O | O | X | X | X | O | LK | OR | OR |

The hydraulic control system of the present invention will be described hereinafter referring to FIG. 2. The hydraulic control system selectively operates the clutches 12, 24 and 25 and brakes 19, 26, 27 and 40 in order to attain automatic or manual speed change operation.

The hydraulic control system comprises an oil reservoir 100, an oil pump 101, a primary pressure regulating valve 102, a secondary pressure regulating valve 103, a throtle valve 200, a cut-back valve 201, a manual selector valve 210, a first shift valve 220, a second shift valve 230, a third shift valve 240, a coast modulator valve 250, an accumulator 260 for providing smooth engagement of the clutch 24, an accumulator 270 for providing smooth engagement of the clutch 25, an accumulator 280 for providing smooth engagement of the brake 40, a lockup control valve 290, a by-pass valve 300, flow control valves 310, 320, 330, 340, 350, 360, 370 and 502 each having an orifice and a check ball, a check valve 380, a relief valve 390, a second solenoid valve 400 for controlling the second shift valve 230, a third solenoid valve 410 for controlling the third shift valve 240, a fourth solenoid valve 420 for controlling the lockup control valve 290, a first solenoid valve 430 for controlling the first shift valve 220 and oil passages connecting the valves and the hydraulic servomechanisms 12A, 19A, 24A, 25A, 25B, 26A, 27A, 27B and 40A of the clutches and brakes respectively.

The hydraulic fluid pumped up from the oil reservoir 100 with the oil pump 101 is adjusted to a predetermined pressure (the line pressure) by the primary pressure regulating valve 102, then supplied to an oil passage 104. The surplus oil supplied to the primary pressure regulating valve is supplied to the secondary pressure regulating valve 103 through an oil passage 105 and is adjusted to a predetermined torque converter pressure, lubricating pressure and cooler pressure corresponding to the throttle pressure of the throttle valve 200 applied to the secondary pressure regulating valve 103 through an oil passage 124. The manual selector valve 210 communicating with the oil passage 104 isiinterlocked with a shift lever. The manual selector valve 210 is placed by the manual operation of the shift lever at position P, R, N, D, I or L corresponding to the operation of the shift lever.

The manual selector valve 210 introduces the line pressure of the passage 104 to passages 106, 107, 108, 109 or 110 as shown in Table 2 corresponding to the shift position of the shift lever adapted to be operated by the driver.

TABLE 2

| Shift position | Passage 106 | Passage 107 | Passage 108 | Passage 109 | Passage 110 |
|---|---|---|---|---|---|
| P | X | X | X | X | X |
| R | X | X | X | X | O |
| N | O | X | X | X | X |
| D | O | O | X | X | X |
| I | O | O | O | X | X |
| L | O | O | O | O | X |

In Table 2, the symbols "O" and "X" designate that the line pressure is applied to, and cut off from the particular passages respectively corresponding to the shift position of the shift lever.

The first solenoid valve 430 for controlling the first shift valve closes a port 431 while the solenoid is not energized so that the oil pressure is applied to a passage 501 which communicates with the passage 104 through an orifice 431, whereas the first solenoid valve 430 opens the port 432 when the solenoid is energized to drain the pressurized oil from the passage 501 through a drain port 433. The second solenoid valve 400 for controlling the second shift valve 230 closes a port 401 while the solenoid is not actuated so that the line pressure is applied to a passage 111 which communicates with the passage 107 through an orifice 402, whereas the second solenoid valve 400 opens the port 401 to drain the pressurized oil from the oil passage 111 through a drain port 403 when the solenoid is energized. The third solenoid valve 410 for controlling the third shift valve 240 closes a port 411 while the solenoid is not energized so that the line pressure is applied to a passage 112 communicating with the passage 104 through an orifice 412, whereas the solenoid valve 410 opens the port 411 when the solenoid is energized to drain the pressurized oil from the passage 112 through a drain port 413. The fourth solenoid valve 420 for controlling the lockup control valve 290 closes a port 421 while the solenoid is not energized so that the line pressure is applied to a passage 114 which communicates with the passage 104 through an orifice 424, whereas the solenoid valve 420 opens the port 421 when the solenoid is energized to drain the pressurized oil from the passage 114 through a drain port 423.

Table 3 shows the relationship between the state of speed range of the automatic transmission and the operating conditions of the solenoid valves 400, 410 and 430, wherein a symbol "O" and a symbol "X" designate the energized and de-energized states, respectively, of the respective solenoids of the solenoid valves.

TABLE 3

| State of speed range | 1st solenoid valve 430 | 2nd solenoid valve 400 | 3rd solenoid valve 410 |
| --- | --- | --- | --- |
| N | O | X | X |
| R | O or X | O or X | O or X |
| 1st | X | O | O |
| 2nd | X | O | X |
| 3rd | O | O | O |
| 4th | O | O | X |
| 5th | O | X | O |
| 6th | O | X | X |

The first shift valve 220 has a spool 222 which is resiliently urged by a spring 221 at one end thereof. With the automatic transmission in the first or in the second speed, the solenoid valve 430 is not energized and, therefore, the line pressure is applied to the passage 501 so that the spool 222 is retained at the left-side position as shown in the drawing by the line pressure applied to a rightside oil chamber 223 through the passage 501 allowing the communication of the passage 110 with a passage 113 and a passage 131 with a passage 132. With the automatic transmission in the third speed, fourth speed, fifth speed or the sixth speed, the solenoid valve 430 is energized and, therefore, the passage 501 is drained so that the spool 222 is moved toward and retained at the rightside position allowing the communication of the passage 106 with the passage 113, the passage 110 with the passage 132 and the passage 131 with a passage 133.

The second shift valve 230 has a spool 232 and a spool 233 urged at one end thereof by a spring 231. With the automatic transmission in the first speed, second speed, third speed or the fourth speed, the solenoid valve 400 is energized and, therefore, the line pressure is not applied to the passage 111 so that the spools 232 and 233 are retained at the left-side position as shown in the drawing by the action of the spring 231 allowing the communication of the passage 110 with passages 118 and 135 and the passage 135 with a passage 136. With the automatic transmission in the fifth speed or the sixth speed, the solenoid valve 400 is de-energized and, therefore, the line pressure applied the passage 111 so that the spools 232 and 233 are moved toward and retained at the rightside position by the line pressure applied to the left-side oil chamber through the passage 111 allowing the communication of the passage 107 with the passage 118.

The third shift valve 240 has a spool 242 urged at one end thereof by a spring 241. With the automatic transmission in the first speed, third speed or the fifth speed, the solenoid valve 410 is energized and, therefore, the line pressure is not applied to the passage 112 so that the spool 242 is retained at the left-side position by the spring 241 allowing the communication of the passage 104 with a passage 117. With the automatic transmission in the second speed, fourth speed or the sixth speed, the solenoid valve 410 is de-energized and, therefore, the line pressure is applied to the passage 112 so that the spool 242 is retained at the rightside position as shown in the drawing by the line pressure applied to the left-side oil chamber through the passage 112 allowing the communication of the passage 104 with a passage 119 and the passage 117 with a drain port 244.

The throttle valve 200 has an indicator valve 202, a valve spool 203 and a spring 204 interposed between the indicator valve 202 and the valve spool 203. The indicator valve 202 strokes corresponding to the throttle opening compressing the spring 204 to produce a throttle pressure in the passage 124.

The cut-back valve 201 is adapted to introduce the throttle pressure in the passage 124 to a passage 125 when an oil pressure is applied the passage 113 (third, fourth, fifth or sixth speed) thus eliminating the wasteful power consumption of the pump by reducing the throttle pressure.

The modulator valve 250 has a spool 251 and a spring 252. When the manual selector valve 210 is shifted to the L-position, the modulator valve 250 modulates the oil pressure applied to the modulator valve through the passage 109 to apply a modulator pressure to a passage 130.

The lockup control valve 290 has a spool 292 urged at one end thereof by a spring 291. With the automatic transmission in the first or the second speed, the spool 292 is retained at the lower position by the force of the spring 291 as shown in the drawing, since no oil pressure is applied to an oil chamber 293 allowing the communication of a passage 120 with a passage 121. With the automatic transmission in the third, fourth, fifth or the sixth speed, an oil pressure is applied to the oil chamber 293. However, if the solenoid valve 420 is de-energized while the oil pressure is applied to the oil chamber 293, the line pressure is applied to an oil chamber 294, then the action of the line pressure and the force of the spring 291 overcome the action of the oil pressure applied to the oil chamber 293 so that the spool 292 is urged toward and retained at the lower position, whereas, if the solenoid valve 420 is energized in the same circumstances, the oil chamber 294 is drained so that the spool 292 is moved toward and retained at the upper position allowing the communication of the passage 120 with the passage 122.

When the manual selector valve 210 is shifted to the D-position, the line pressure is introduced into the passages 106 and 107 through the passage 104.

With the automatic transmission in the first speed, the solenoid valve 430 is de-energized while the solenoid valves 400 and 410 are energized. Consequently, the spool 222 of the first shift valve 220 is retained at the left-side position as shown in the drawing by the action of the line pressure applied to the oil chamber 223, the spool 232 of the second shift valve 230 is retained at the left-side position as shown in the drawing by the action of the spring 231 and the spool 242 of the third shift valve 240 is retained at the left-side position by the action of the spring 241. The line pressure is applied to the hydraulic servomechanism 24A through the passage 107 and also to the hydraulic servomechanism 12A through the passage 104, the third shift valve 240 and the passage 117 so that the clutches 24 and 12 are engaged.

With the automatic transmission in the second speed, the solenoid valve 410 is de-energized and, therefore, the spool 242 of the third shift valve 240 is moved rightward as shown in the drawing. Simultaneously with the communication of the passage 117 with the drain port 244 and the draining of the hydraulic servomechanism 12A, the line pressure of the passage 104 is introduced to the hydraulic servomechanism 19A through the third shift valve 240 and the passage 119 so that the clutch 12 is released and the brake 19 is engaged.

With the automatic transmission in the third speed, the solenoid valves 430 and 410 are energized. Consequently, the spool 222 of the first shift valve 220 is moved rightward, while the spool 242 of the third shift valve 240 is moved leftward. The line pressure of the passage 106 is introduced to the hydraulic servomechanism 40A through the first shift valve 220 and the passage 113, while the line pressure of the passage 104 is introduced to the hydraulic servomechanism 12A through the third shift valve 240 and the passage 117 so that the brake 40 and the clutch 12 are engaged, at the same time, the brake 19 is released since the hydraulic servomechanism 19A is drained through the passage 119 and the third shift valve 240.

With the automatic transmission in the fourth speed, the solenoid valve 410 is de-energized and, therefore, the spool 242 of the third shift valve 240 is moved rightward as shown in the drawing. Then the passage 117 is allowed to communicate with the drain port 244 so that the hydraulic servomechanism 12A is drained, while the line pressure of the passage 104 is introduced to the hydraulic servomechanism 19A through the third shift valve 240 and the passage 119, thus the clutch 12 is released and the brake 19 is engaged.

With the automatic transmission in the fifth speed, the solenoid valve 400 is de-energized, while the solenoid valve 410 is energized. Consequently, the spools 232 and 233 of the second shift valve 230 are moved rightward. Then the line pressure of the passage 107 is introduced to the hydraulic servomechanism 25B through the second shift valve 230 and the passage 118 so that the clutch 25 is engaged, while the spool 242 of the third shift valve 240 is moved leftward and, therefore, the line pressure of the passage 104 is introduced to the hydraulic servomechanism 12A so that the clutch 12 is engaged and the brake 19 is released since the hydraulic servomechanism 19A is drained.

With the automatic transmission in the sixth speed, the solenoid valve 410 is de-energized so that the spool 242 of the third shift valve 240 is moved rightward as shown in the drawing. Then the passage 117 is allowed to communicate with the drain port 244 so that the hydraulic servomechanism 12A is drained, while the line pressure of the passage 104 is introduced to the hydraulic servomechanism 19A through the third shift valve 240 and the passage 119 so that the brake 19 is engaged and the clutch 12 is released.

When the manual selector valve 210 is shifted to the I-position, the line pressure is introduced to the passages 106, 107 and 108 through the passage 104.

The line pressure of the passage 108 is applied to the oil chamber 243 of the third shift valve 240 so that the spool 242 is retained at the left-side position. Accordingly, if the solenoid valve 410 is de-energized with which the automatic transmission might be shifted to the second, fourth or sixth speed, the third shift valve 240 is not changed-over, therefore, shifting to the second, fourth or the sixth speed is prevented. The first shift valve 220 and the second shift valve 230 are free to be changed-over as with the manual selector valve 210 at the D-position, therefore, when the manual selector valve 210 is shifted to the I-position, automatic transmission to three forward speeds, namely, the first, third and the fifth speed, is allowed.

When the manual selector valve 210 is shifted to the L-position, the line pressure is introduced to the passages 106, 107, 108 and 109 through the passage 104 for the effective operation of engine braking. The line pressure of the passages 106, 107 and 108 is introduced to the respective hydraulic servomechanisms in the same manner as in the case when the manual selector valve 210 is shifted to the I-position. The line pressure of the passage 109 is modulated by the modulator valve 250 to a modulator pressure, then applied to the passage 130. With the automatic transmission in the fifth speed, the flow of the hydraulic fluid through the passage 130 is interrupted by the spool 233 of the second shift valve 230, whereas, with the automatic transmission in the first or the third speed, the passage 130 is allowed to communicate with the passage 131 by means of the second shift valve 230.

With the automatic transmission in the first speed, the spool 222 of the first shift valve 220 is retained at the left-side position as shown in the drawing allowing the communication of the passage 131 with the passage 132 so that the modulator pressure of the passage 130 is introduced to the hydraulic servomechanism 27B through the passage 131 and 132. At this time, the modulator pressure of the passage 132 is controlled at or below the set pressure by the existence of the relief valve 390 which is disposed between the passage 132 and 110. The relief valve 390 is provided in order to maintain the pressure of the passage 132 at a set value by draining the hydraulic fluid from the passage 132 through the passage 110 and the manual selector valve 210 when the pressure in the passage 132 exceeds the set value. When the modulator pressure is applied to the hydraulic servomechanism 27B, the brake 27 is engaged so that the automatic transmission is shifted to the first speed in which engine braking is effective.

With the automatic transmission in the third speed, the spool 222 of the first shift valve 220 is retained at the rightside position allowing the communication of the passage 131 with the passage 133 so that the modulator pressure of the passage 130 is introduced to the hydraulic servomechanism 26A through the passages 131 and 133 whereby the brake 26 is engaged. When the brake is engaged, the automatic transmission is shifted to the third speed in which engine braking is effective.

With the automatic transmission in the fifth speed, the spools 232 and 233 of the second shift valve 230 is retained at the rightside position interrupting the flow of the hydraulic fluid through the passage 130 with the spool 233 so that the hydraulic control system is arranged in the state the same with that of the fifth speed when the manual shift valve is shifted to the I-position or the D-position.

It is noted that when the manual selector valve is shifted to the L-position, automatic transmission between the three forward speeds, namely, the first, third and the fifth speed, in which BvNngine braking is effective, is possible.

In the shifting-up operation from the second to the third speed while the manual selector valve being placed at the D-position and from the first to the third speed while the manual selector valve being placed at the I-position or the L-position, the spool 222 of the first shift valve 220 is moved rightward allowing the communication of the passage 106 with the passage 113 and the line pressure of the passage 106 is introduced suddenly to the oil chamber 293 of the lockup control valve 290 through the passage 113, however, the spool 292 may be retained at the lower position as shown in the drawing by de-energizing the solenoid valve 420 to apply the line pressure to the oil chamber 294. In this state, the oil pressure of the passage 120 is introduced to the passage 121 and the direct-coupling clutch 50 of the fluid torque converter is disengaged. When the solenoid valve 420 is energized, the oil chamber 294 is drained so that the spool 292 is retained at the upper position by the action of the pressurized oil supplied into the oil chamber 293 whereby the pressure of the passage 120 is introduced to the passage 122 so that the direct-coupling clutch is engaged. The flow control valve 502 having an orifice and a check ball is disposed in the passage 122 retards the flow of the pressurized oil from the passage 122 to the direct-coupling clutch 50.

When the manual selector valve 210 is placed at the R-position, the line pressure is introduced into the passage 110 through the passage 104. The line pressure of the passage 110 is applied to the oil chamber 102A of the primary pressure regulator valve 102 and causes the line pressure to be increased, and also the line pressure is introduced to the hydraulic servomechanisms 27A and 27B of the brake 27 through the orifice 134 and the check valve 380 so that the brake 27 is engaged. At this time, the pressurized oil is supplied to the discharge side of the relief valve 390 through the passage 110, therefore, the relief valve 390 remains closed and the line pressure is introduced to the hydraulic servomechanisms 27A and 27B. The brake 27 is operated by the two hydraulic servomechanisms 27A and 27B. In applying engine braking with the automatic transmission in the first speed, the line pressure is applied to the hydraulic servomechanism 27B, while the manual selector valve is placed at the R-position, in which a great torque is available, the line pressure is applied to both hydraulic servomechanisms 27A and 27B. In the latter case, the increase in the oil pressure of the hydraulic servomechanism 27B is more rapid than that of the hydraulic servomechanism 27A due to the provision of the orifice 134. The line pressure of the passage 110 is introduced to the oil chamber 224 of the first shaft valve 220 and cooperates with the spring 221 to retain the spool 222 at the rightside position. Consequently, the line pressure of the passage 110 is introduced to the hydraulic servomechanism 27B through the first shift valve 220 and the passage 132. At the same time, as decribed hereinbefore, the line pressure is introduced to the hydraulic servomechanism 27B from the passage 110 also through the check valve 380 and the passage 132. Still further, the line pressure of the passage 110 is introduced to the hydraulic servomechanisms 25B through the second shift valve 230 and the passage 118 as well as to the hydraulic servomechanism 25A through the passages 118, 135 and 136 so that the clutch 25 is engaged. The clutch 25 is adapted to be controlled by the two hydraulic servomechanisms 25A and 25B. With the automatic transmission in the forward fifth speed position, the line pressure is applied to the hydraulic servomechanism 25B, while the manual selector valve is placed at the R-position, in which a great torque is available, the line pressure is applied to both hydraulic servomechanisms 25A and 25B.

During low-speed running, the solenoid valve 410 is energized, the spool 242 of the third shift valve 240 is retained at the left-side position, the passaqe 104 communicates with the passage 117 and the line pressure of the passage 104 is introduced to the hydraulic servomechanism 12A through the passage 117 so that the clutch 12 is engaged.

During high-speed running, the solenoid valve 410 is de-energized, the spool 242 of the third shift valve 240 is retained at the rightside position as shown in the drawing allowing the communication of the passage 104 with the passage 119 so that the line pressure is introduced to the hydraulic servomechanism 19A through the passage 119 and the pressurized oil is drained from the hydraulic servomechanism 12A through the passage 117, the third shift valve 240 and the drain port 244, whereby the clutch 12 is disengaged and the brake 19 is engaged.

As is clear from the above description, according to the present invention, the hydraulic control system for the automatic transmission equipped with an auxiliary transmission mechanism controls the supply of pressurized oil to the respective frictional engagement elements by means of the first and the second shift valves which are controlled by the first and the second solenoid valves respectively, and controls also the supply of pressurized oil to the direct-coupling frictional engagement elements or frictional engagement elements for changing-over the auxiliary transmission mechanism by means of the third shift valve which is controlled by the third solenoid valve, whereb six forward-speed transmission is provided by the combination of the main transmission and the auxiliary transmission mechanism. Furthermore, the possibility of six forward speed transmission facilitates the selection of the optimum speed range in respect of fuel consumption rate corresponding to the running conditions of the vehicle, thus contributing to the improvement of the fuel consumption rate.

What is claimed is:

1. An automatic transmission including a fluid torque converter, a first gear unit having three forward-speed gears and a single reverse gear, a second gear unit having a low-speed gear and a high-speed gear, and a hydraulic control system, said hydraulic control system comprising:
   a source of pressurized fluid;
   a first shift valve for controlling the shifting between the first-speed gear and the second-speed gear of the first gear unit;
   a second shift valve for controlling the shifting between the second-speed gear and the third-speed gear of t he first gear unit;
   a third shift valve equipped with a spool having two positions for controlling the shifting between the low-speed gear and the high-speed gear of the second gear unit;
   a manual selector valve having a plurality of shift positions for distributing the pressurized fluid supply from said source of pressurized fluid to said first, second and third shift valves respectively;
   first, second and third solenoid valves corresponding to said first, second and third shift valves, respectively for independently controlling the operation of the respective shift valves, thereby establishing a six forward-speed automatic transmission by combining the low-speed gear and the high-speed gear of said second gear unit with each of the first-speed gear, the second-speed gear and the third-speed gear of said first gear unit; and means to fixedly position the spool of said third shift valve at one of said two positions by supplying the pressurized fluid to said third shift valve when said manual selector valve is shifted to a particular shift position, thereby locking said second gear unit in one of said low-speed gear and said high-speed gear, whereby said six forward-speed automatic transmission is converted to a three forward-speed automatic transmission when said manual selector valve is shifted to said particular shift position.

2. An automatic transmission according to claim 1, wherein each of said first, second and third shift valves has at least one spool, a spring for urging said spool at one axial end position and a fluid chamber for urging and retaining said spool at the other axial end position against the resilient force of said spring, and each of said first, second and third solenoid valves is adapted to drain the fluid chamber of the corresponding shift valve when it is energized.

3. An automatic transmission according to claim 1, wherein said third shift valve comprises a spool having first, second and third lands, first and fourth fluid chambers formed at the opposite ends of the valve body around the axial opposite ends of said spool for slidably receiving said first and third lands, a second and a third fluid chamber formed between said first land and said third land and partitioned by said second land and a spring provided within said fourth fluid chamber and adapted to apply a resilient force to said spool, said second land is arranged so as to selectively allow the communication of said second and third fluid chambers with a fluid passage connected to said source of pressurized fluid according to the axial shifting of the position of said spool, said first fluid chamber communicates with said fluid passage through an orifice, said fourth fluid chamber is connected to said source of pressurized fluid through said manual selector valve, and said third solenoid valve is adapted to drain said first fluid chamber when it is energized.

4. The automatic transmission of claim 1 wherein said manual selector valve has a pluraity of forward shift positions, a neutral shift position and a reverse shift position.

5. The automatic transmission of claim 1 wherein said particular position of the manual selector valve fixes said spool of said third shift valve at a position corresponding to said low-speed gear of said second gear unit.

6. The automatic transmission of claim 5 where the positioning of the manual selector valve in the particular position provides a three-speed automatic transmission limited to the first, third and fifth speeds of the six-speed automatic transmission.

* * * * *